United States Patent [19]
Green et al.

[11] Patent Number: 5,772,243
[45] Date of Patent: Jun. 30, 1998

[54] IGNITER FOR GAS BAG INFLATOR

[76] Inventors: David J. Green, 632 W. 300 North, Brigham, Utah 84302; Donald R. Lauritzen, 948 W. 3rd North, Hyrum, Utah 84319

[21] Appl. No.: 916,558

[22] Filed: Aug. 22, 1997

Related U.S. Application Data

[63] Continuation of Ser. No. 566,761, Dec. 4, 1995, abandoned.

[51] Int. Cl.⁶ .................................................. B60R 21/26
[52] U.S. Cl. ................ 280/741; 102/202.5; 102/202.14; 102/531
[58] Field of Search ................................... 280/741, 736, 280/737, 740, 742; 102/202.14, 202.5, 202.12, 530, 531; 422/166, 165, 164

[56] References Cited

U.S. PATENT DOCUMENTS

| | | | |
|---|---|---|---|
| 2,471,381 | 5/1949 | Yurick et al. | 102/202.5 |
| 2,926,607 | 3/1960 | Muller, Jr. et al. | 102/530 |
| 2,934,014 | 4/1960 | Smith et al. | 102/202.14 |
| 2,995,088 | 8/1961 | Asplund | 102/530 |
| 3,774,807 | 11/1973 | Keathley et al. | 280/737 |
| 3,985,076 | 10/1976 | Schneiter et al. | 280/729 |
| 4,296,084 | 10/1981 | Adams et al. | 422/166 |
| 4,561,675 | 12/1985 | Adams et al. | 280/736 |
| 4,722,551 | 2/1988 | Adams | 280/736 |
| 4,890,860 | 1/1990 | Schneiter | 280/741 |
| 4,959,011 | 9/1990 | Nilsson | 431/263 |
| 5,046,429 | 9/1991 | Swann et al. | 280/741 |
| 5,109,772 | 5/1992 | Cunningham et al. | 280/741 |
| 5,140,906 | 8/1992 | Little, II | 102/530 |
| 5,142,982 | 9/1992 | Diepold et al. | 102/530 |
| 5,259,644 | 11/1993 | Albrecht et al. | 280/741 |
| 5,388,859 | 2/1995 | Fischer et al. | 280/737 |
| 5,456,492 | 10/1995 | Smith et al. | 280/737 |
| 5,462,307 | 10/1995 | Webber et al. | 280/737 |
| 5,533,751 | 7/1996 | Kort et al. | 280/741 |
| 5,551,725 | 9/1996 | Ludwig | 280/737 |

FOREIGN PATENT DOCUMENTS

| | | | |
|---|---|---|---|
| 592254 | 4/1994 | European Pat. Off. | 280/736 |
| 40 09 551 | 9/1991 | Germany | 280/736 |

*Primary Examiner*—Brian L. Johnson
*Assistant Examiner*—Peter C. English

[57] ABSTRACT

A low pressure igniter system for a gas bag inflator using a head-end chamber or closure to house a pyrotechnic ignition compound that is ignited by an initiator (squib). The housing for the igniter includes a base having a skirt that extends from the periphery of the base with the base and the skirt being a single piece of material. When initiated the low pressure igniter has a large flame front producing hot gas and particles. The low pressure igniter provides a low cost alternative to current pyrotechnic igniters, and is further advantageous in that it makes practicable fabrication of inflator housings of sheet steel.

16 Claims, 4 Drawing Sheets

IGNITER FOR GAS BAG INFLATOR

This is a continuation of application Ser. No. 08/566,761 filed on Dec. 4, 1995, abandoned.

BACKGROUND OF THE INVENTION

1. Field of the Invention

The present invention relates to an improvement in igniters for gas generators, or inflators, that use pyrotechnic gas generant material for inflating air bags which are part of a vehicle occupant restraint system.

2. Description of the Prior Art

Inflatable air bags are mounted within vehicles in positions to be deployed, in the event of a crash, for cushioning an occupant from the effects of the crash. It is well known in the art to inflate air bags by inflators that use a combustible solid gas generant charge.

Typically, an inflator for a passenger side air bag includes a cylindrical housing that is provided with openings for the release of gas, a gas generant material or charge, in pellet or wafer form, that is deployed along the interior length of the housing, and a cooling and filtering structure surrounding the combustible gas generant material to filter out hot or burning particles and to cool the gas produced by the gas generant material. Ignition of the gas generant material in the inflator is achieved by an igniter.

Current inflator igniters use either a tubular linear igniter that extends down the length of the inside of the gas generant material, as disclosed in U.S. Pat. No. 4,890,860 which was granted on Jan. 2, 1990 to Fred E. Schneiter, or a head end closed high pressure igniter, as disclosed in U.S. Pat. No. 5,443,286 which was granted on Aug. 22, 1995 to Donald J. Cunningham and James D. Erickson, both of which patents are assigned to the same assignee as that of the present invention.

The linear igniter is well known in the industry. This igniter has a metal perforated tube that extends down the length of the inflator. It contains a linear transfer lead, or conductor, specifically Rapid Deflagrating Cord, and is filled with a pyrotechnic ignition compound, most commonly boron potassium nitrate ($BKNO_3$). A disadvantage of this igniter is that it is expensive to manufacture.

The closed end igniter, known also as a Basket igniter, operates at relatively high pressures. It is made using a base and cup filled with ignition compound. When this igniter is fired, as by an initiator, there is a high pressure build up therein. Upon attaining a sufficient pressure build up, a burst disk ruptures and a fire ball of hot gases and particulates is ejected with great force and velocity through a nozzle outlet opening. This fire ball flows under high pressure into a gas generant. This can crush the, gas generant pellets, as a the fire ball is a flame of little width having a small diameter. Disadvantages of this igniter are that the flame is at high pressure and velocity and includes the burst disk having the characteristics of a projectile, and the inflator and its filter must be built strong enough to withstand the high ignition pressures that are involved which adds significantly to the manufacturing cost.

The need and demand for a lower cost technically efficiently effective alternative igniter for inflators has led to the present invention which was devised to fill the technological gap that has existed in the art in this respect.

SUMMARY OF THE INVENTION

An object of the invention is to provide a low pressure igniter having a large flame front producing hot gas and particles for a gas bag inflator.

Another object of the invention is to provide a low pressure igniter so that low cost inflator housings can be formed out of sheet metal and forged or drawn for others.

Still another object of the invention is to provide for a gas bag inflator a low pressure igniter that is characterized by having a large diameter flame front with excellent hot particle distribution and which is projectile free.

In accomplishing these and other objectives of the invention, an inflator igniter has been devised that has multiple holes in an end plate through which hot flame flows to ignite the gas generant upon initiation of the igniter to function. This plate has a metallic or plastic film covering the holes in order to retain ignition compound in the igniter until the igniter is initiated to function. This structure also maintains a small volume while the ignition compound is being ignited by a squib. The small volume allows the pressure in the igniter to build up faster by reducing the time that is required to fill the small volume with gas. A side firing squib is desirable in that it better enhances the ignition of the ignition compound itself. This igniter spreads a large diameter of flame with lots, that is, a great number or quantity, of hot particles onto the gas generant, and effects smooth ignition thereof.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which preferred embodiments of the invention are illustrated.

BRIEF DESCRIPTION OF THE DRAWINGS

With this summary of the invention, a detailed description follows with reference being made to the accompanying drawings which from a part of the specification, of which.

The same reference numerals refer to the same elements throughout the various figures.

DESCRIPTION OF THE PREFERRED EMBODIMENT

Figure 4:
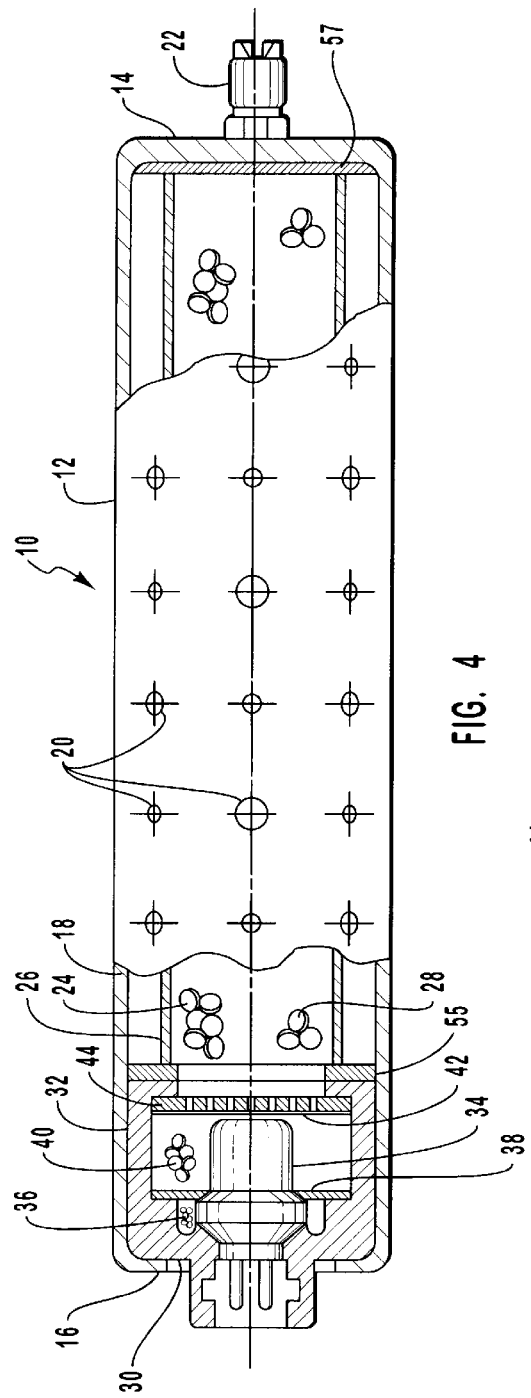
FIG. 4 is a side elevation view, partially in longitudinal section, of an inflator in which the igniter shown in FIGS. 1, 2 and 3 may be used for a vehicle occupant restraint system.
Figure 5:
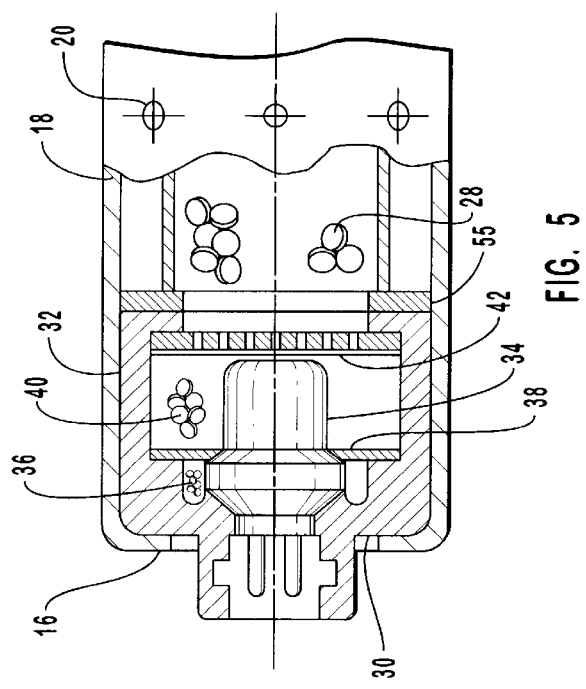
FIG. 5 is an enlarged longitudinal sectional view of the open end of the inflator of FIG. 4.

With reference to the drawings, and particularly FIGS. 4 and 5, there is shown an inflator 10 for inflating the air bag of a vehicle occupant restraint system. The inflator 10 described herein is well adapted for inflating the air bag on the passenger side of the vehicle. The invention described herein, however, is applicable to inflating air bags in other locations as well.

The inflator 10 includes a generally cylindrical housing 12 having a closed end 14 and an open end 16, with a tubular side wall portion 18 therebetween. The housing 12 may be fabricated of aluminum, with the closed end 14 integral with the elongated tubular side wall portion 18, or may be formed out of steel.

The tubular side wall portion 18 defines a plurality of openings, generally indicated at 20, to permit the outflow of generated gas. The openings 20 are provided in a repetitious pattern along the side wall 20 in diametrically opposed groups in order that the outflow of gas does not produce uneven thrust which could cause the inflator 10 to become a projectile. This "thrust neutral" deployment of openings is known in the art. Inflators are fabricated in both thrust directional and thrust neutral arrangements. The thrust neutral configuration is desirable where inflators are stored or shipped separate from a reaction can.

The housing 12 further comprises a mounting stud 22 that extends axially from the closed end wall 14. The stud 22 is utilized to mount the inflator 10 in an operative position in a vehicle occupant restraint system.

Figure 6:
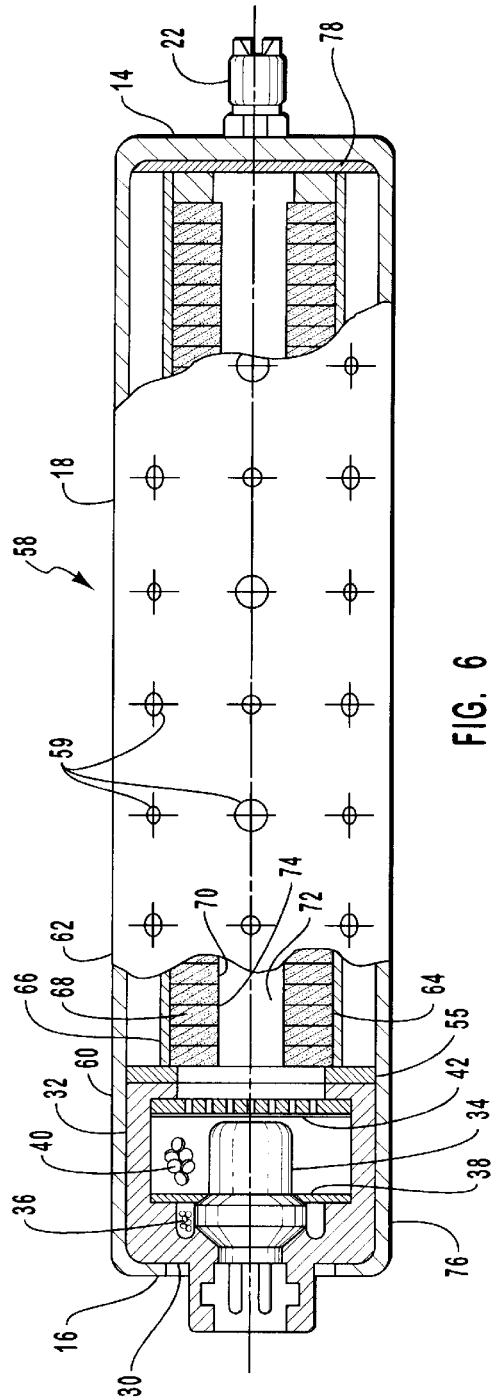
FIG. 6 is a side elevation view, partially in longitudinal section, of another inflator employing an alternative configuration of gas generant material in which the igniter shown in FIGS. 1, 2 and 3 may be used for a vehicle occupant restraint system.

The housing 12 also contains a gas generant material 24 and a filter and cooling assembly 26. The gas generant material 24 is discontinuous, that is, characterized by interruptions or breaks. In FIG. 4 the gas generant material 24 is shown as comprising pellets 28. In FIG. 6 the gas generant material is shown as comprising spaced wafers 68.

The gas generant material 24 may be one of any number of compositions meeting the requirements of burning rate, non-toxicity and flame temperature. One composition which is utilized, in a preferred embodiment of the invention, is that described in U.S. Pat. No. 4,203,787 to Kirchoff et al. which is assigned to the same assignee as the present invention, the disclosure of which patent is incorporated herein by reference. Particularly preferred are compositions comprising from about 65 percent by weight to about 70 percent by weight metal azide, up to about 4 percent by weight sulfur and from about 27 percent to about 33 percent by weight molybdenum disulfide, especially a composition comprising about 68 percent by weight sodium azide, about 3 percent by weight sulfur, and about 30 percent by weight molybdenum disulfide. The construction of the inflator 10 is disclosed more fully in the aforementioned U.S. Pat. No. 5,443,286 that was granted to Donald J. Cunningham and James D. Erickson.

An inflator igniter 30 according to this invention is mounted in an igniter housing 32 in the open end 16 of the housing 12. The igniter 30 functions both to provide closure for the open end 16 of the housing 12 as well as to ignite the combustible gas generant 24. The open end 16 of the housing 12 is roll crimped onto the igniter 30 in order to assemble the igniter 30 and the igniter housing 32 to the housing 12.

Figure 1:
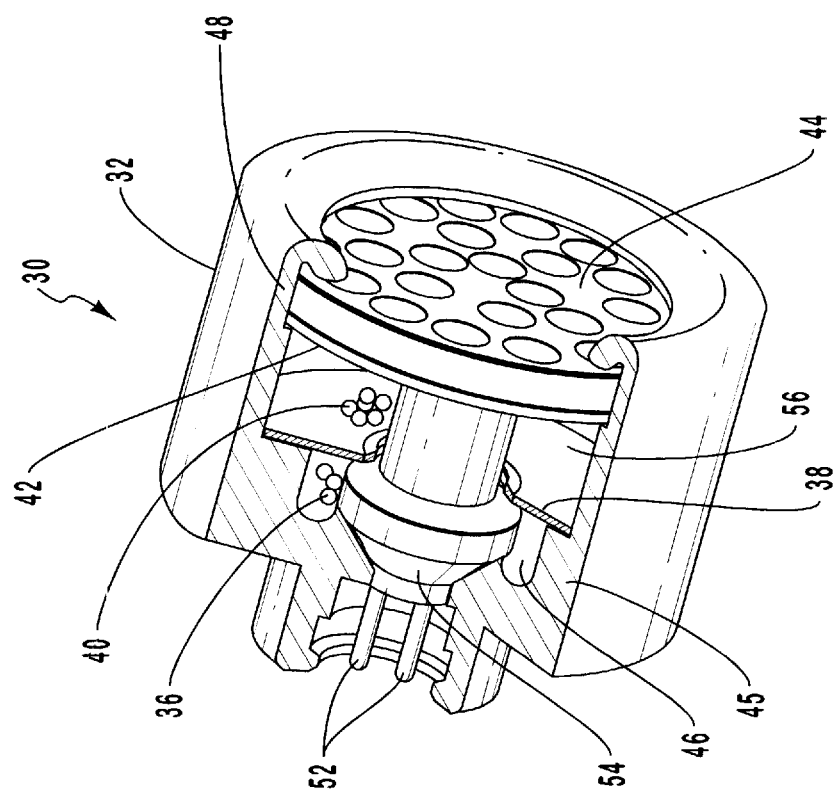
FIG. 1 is a sectional view illustrating a preferred form of inflator igniter according to the invention.
Figure 2:
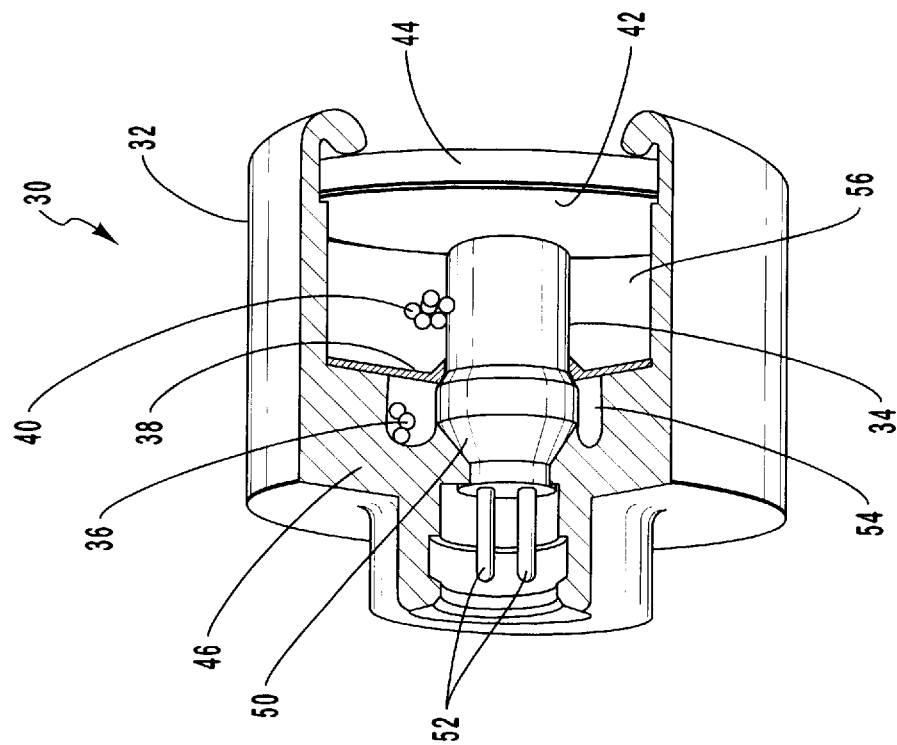
FIG. 2 is a perspective sectional view of the igniter of FIG. 1.
Figure 3:
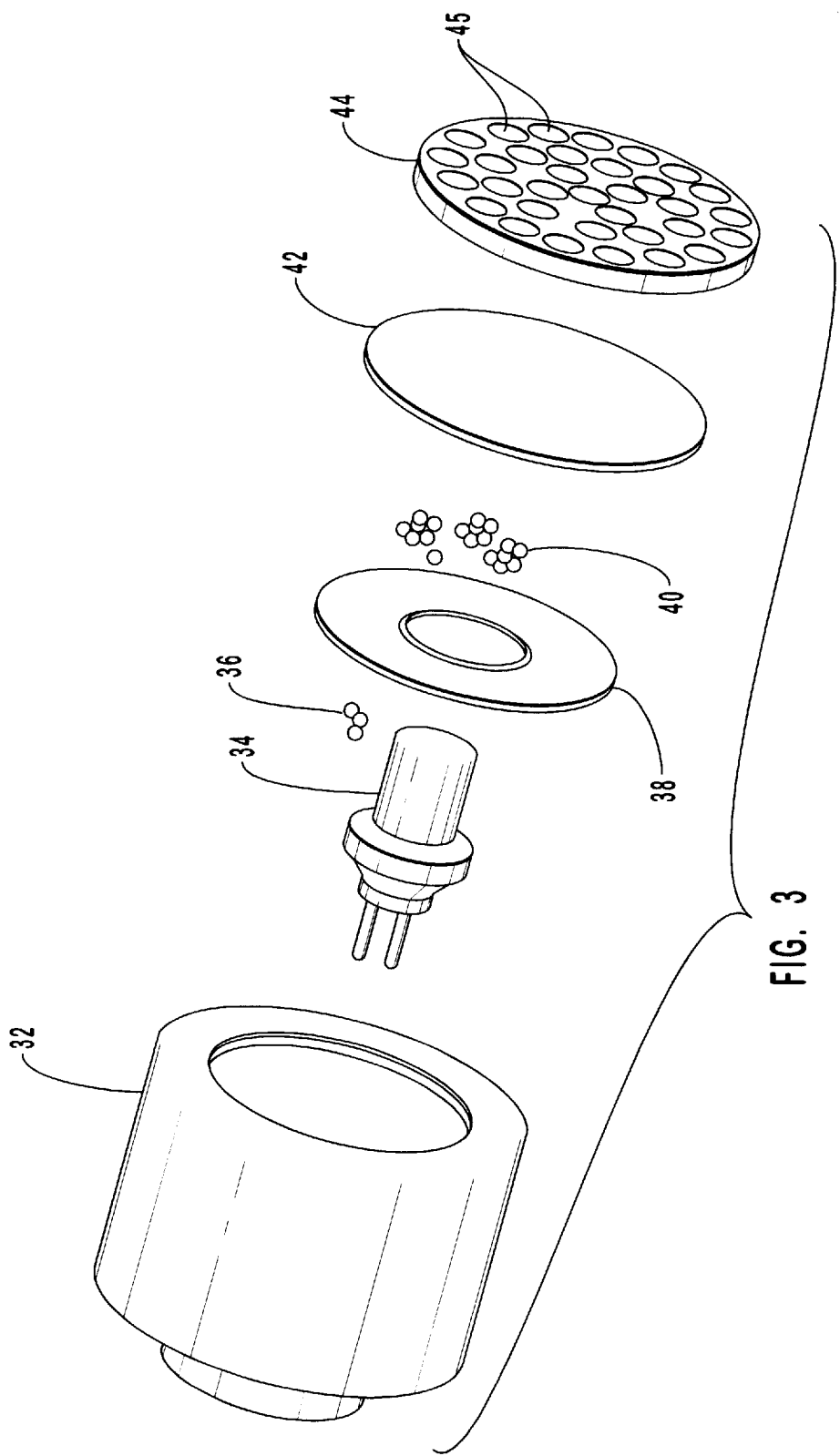
FIG. 3 is an exploded view of the igniter of FIG. 1.

The igniter 30, as best illustrated in FIGS. 1, 2 and 3, comprises the igniter housing 32, an electrically actuated initiator 34, a charge of auto-ignition compound 36, an auto-ignition closure 38, pyrotechnic ignition compound 40, a seal disk 42, and a perforated closure or end plate 44 in which multiple holes 45 are provided.

The igniter housing 32 includes a cylindrical base 46 which has a skirt 48 extending from the periphery thereof, with said base 46 and said skirt 48 being a single piece of material. Prior to assembling the igniter 30, the skirt 48 is tubular. The skirt 48 is roll crimped onto the end closure 44 in order to assemble the end closure 44 and skirt 48 together.

Figure 8A:
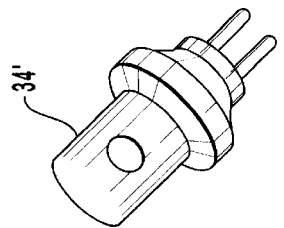
FIG. 8A is a front view and FIG. 8B is a perspective view of a side firing squib.
Figure 8B:
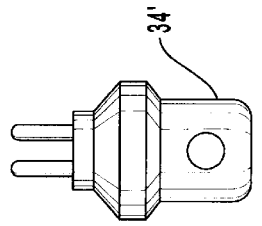

The base 46 of the igniter 30 defines an opening 50 for receiving and mounting the initiator 34. Electrically actuated initiators are well known in the art, by the term "squib," also, and initiate ignition upon application of an electrical pulse or signal to electrical terminals 52 thereof. A squib normally contains a small explosive charge for effecting ignition of the igniter ignition compound 40. To better enhance the ignition of the ignition compound 40, it is desirble to use a side firing squib, such as the squib 34' illustrated in FIGS. 8A and 8B, and a type of squib which also is well known.

In the igniter 30 the charge of auto-ignition compound 36 is positioned in an annular shaped chamber 54 that in the interior of base 46 surrounds the electrical portion of the initiator 34. The auto-ignition closure 38 comprises a thin foil seal that is placed across the chamber 54 in which the electrical portion of the initiator 34 and the auto-ignition compound 36 are positioned.

The seal disk 42, has a predetermined low rupture pressure and comprises a metallic or plastic film having a thickness of one to two thousandths of an inch. The seal disk 42 covers the multiple holes 45 in the end plate 44 and is provided to retain the ignition compound 40 in the igniter 30, until the igniter 30 begins to function, in a chamber 56 in the skirt 48 having as opposite bounds the auto-ignition closure 38 and the seal disk 42. As shown in FIGS. 1 and 2, the initiating portion of the initiator or squib 34 is contained in chamber 56 adjacent the auto-ignition closure 38.

The ignition compound 40 in chamber 56 may be any of a variety of compositions meeting the requirements for rapid ignition and non-toxicity. A preferred material for this use is a smokeless nitrocellulose gun powder such as IMR-3031 made by IMR Inc.

The seal disk 42 maintains a small volume in chamber 56 while the ignition compound is being ignited by initiator 34. This small volume allows the pressure in the igniter 30 to come up faster to the rupture pressure of the seal disk 42 by reducing the time it would take to fill this volume with gas. It is desirable also to use a side firing initiator 34 to better enhance the ignition of the ignition compound itself. When the initiator 34 is initiated, the igniter housing 32 expels through the multiple holes 45 in the end closure 44 a large diameter low pressure flame with lots of hot particles that is projectile free onto the gas generant 24 in the inflator 10, igniting it. The diameter of the flame, as is apparent from the drawings, is at least three times that of the diameter of the initiator 34. This is significantly larger than the igniter flame of the prior art Basket Igniter that is disclosed in the aforementioned U.S. Pat. No. 5,443,286.

With the igniter 30 of the present invention, upon initiation of the initiator 34 the flame front produced by the igniter 30 does not eject the ignited flame at great force and velocity on a front of little width into the gas generant 24 of the inflator. Instead the flame front produced by the igniter 30 is expelled into the gas generant 24 under a force of significantly less power as a flame having a wide diameter that weaves itself into the space between the gas generant pellets or wafers, and around them, and smoothly ignites them without crushing them. Additionally, the large diameter low pressure flame produced by the igniter 30 is further characterized in that it contains lots of hot particles which impinge in igniting manner on the gas generant 24.

Seal pads 55 and 57, as shown in FIG. 4, prevent the low pressure flame from exiting the gas generant at the ends of the filter and cooling assembly 26.

Due to the reduced number of components that are required, the igniter 30 is easy and inexpensive to manufacture. It also eliminates the Rapid Detonating Cord and provides a lead free ignition system. This igniter 30 can be used in all types of pyrotechnic inflators as can be seen by reference to FIGS. 4 and 5 and also by reference to FIGS. 6 and 7.

Figure 7:
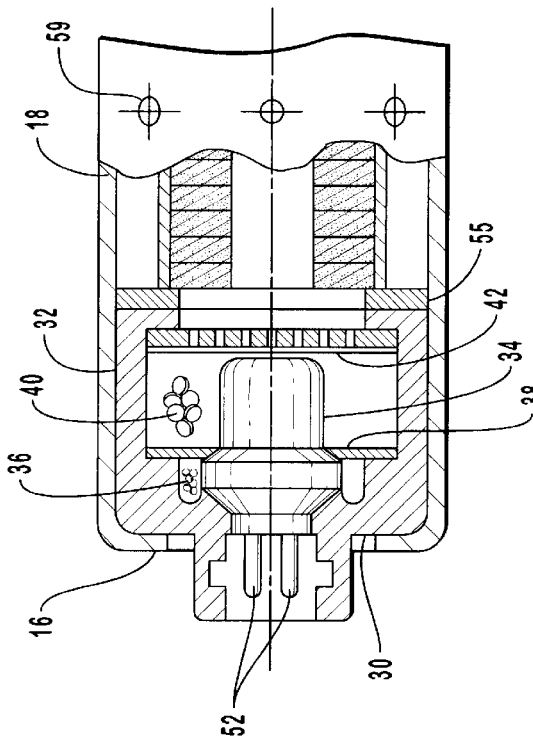
FIG. 7 is an enlarged sectional view of the open end of the inflator of FIG. 6.

With reference to FIGS. 6 and 7, another inflator 58 according to the invention is illustrated. Inflator 58 is characterized by the gas generant material therein, designated by reference number 60, being provided in a cylindrical configuration defining a central passage 72, as referred to hereinafter. The inflator 58 is otherwise similar to inflator 10 described hereinbefore. That is to say, the inflator 58 includes an elongated cylindrical housing 62 made of aluminum or formed of steel and having a plurality of gas outflow openings 59, an igniter 30 closing one end thereof and defining an end closure 44 multiple hole 45 outlet directed along the central axis of the housing 62, and a filter and cooling assembly 66 surrounding the gas generant material 60.

The gas generant material 60, as shown in FIGS. 6 and 7, is provided in a plurality of the spaced wafers 68. Each wafer 68 is annular in shape and is provided with a central opening 70. The central opening 70 has a diameter that is equal to or preferably slightly larger than the outlet opening provided by the end closure 44 of the igniter 30. In a specific embodiment, the wafers 68 may have an outside diameter of 1.44" (3.56 cm), and a central opening of 0.5" (1.27 cm). The central openings 70 are aligned when the wafers 68 are stacked in the filter and cooling assembly 66 thereby providing the central passage 72 in the gas generant material 60.

The construction of the inflator 58 is more fully described in the aforementioned U.S. Pat. No. 5,443,286.

In the operation of the inflator 58, the igniter 30 produces a large diameter low pressure flame having lots of hot particles which is projectile free, which flame is expelled through the multiple holes 45 in the end closure 44 to flow into the central passage 72 in the gas generant material 60. The flame travels freely through the passage 72, igniting all of the wafers 68 substantially simultaneously. Spacers 74 between the wafers 68 maintain clearance between the wafers, whereby initial travel of generated gas radially outward is enabled, both for initial production of gas and for further ignition of the wafers. Seal pads 76 and 78 prevent the igniter flame from exiting the gas generant around the ends of the filter and cooling assembly 66.

A further aspect of the operation of inflators 10 and 58 occurs when they are subject to a high temperature environment such as a bonfire. In such conditions, when the ambient temperature reaches approximately 350° F. (177° C.), the auto-ignition compound 36 self-ignites. This ruptures the auto-ignition closure 38 and sets off the ignition compound 40, and consequently, the inflator gas generant. In the 350° F. (177° C.) temperature range, the aluminum housings 12 and 62 retain their structural integrity, and the inflators 10 and 58 produce gases through their respective gas outflow openings 20 and 59. Without benefit of the auto-ignition compound, the igniter ignition compound and/ or the gas generant material would self-ignite at temperatures in the 650° F. range at which the aluminum housings would not have structural integrity and could fracture with shrapnel.

With this description of the invention in detail, those skilled in the art will appreciate that modifications may be made in the invention without departing from the spirit thereof. Therefore, it is not intended that the scope of the invention is limited to the specific embodiments that have been illustrated and described. Rather, it is intended that the scope of the invention be determined by the appended claims.

What is claimed is:

1. A low pressure igniter for a gas bag inflator having a gas generant material in the form of pellets or wafers that is characterized by providing, when functioning, a large diameter flame front producing hot gas and particles, and which is projectile free, comprising, an igniter housing including a base having a skirt extending from the periphery of said base, said base and said skirt of said housing being a single piece of material, an end plate perforated over substantially the whole area thereof, said perforated end plate being attached to said skirt to form a chamber within said housing, an initiator having an initiating portion, said initiator being mounted in the base of said housing with the initiating portion thereof extending into said chamber, an ignition compound in said chamber, and sealing means having a predetermined low rupture pressure positioned within said chamber and sealing said perforated end plate to retain said ignition compound in said chamber until said igniter begins to function, whereby, upon initation of said igniter, the flame front produced by said igniter does not eject the ignited flame at great force and velocity on a front of little width into the gas generant material of said inflator but instead is expelled into the gas generant material of said inflator under a force of significantly less power as a flame having a wide diameter that weaves itself into the space between the gas generant pellets or wafers and around them and smoothly ignites them without crushing them.

2. A low pressure igniter, as defined by claim 1, wherein said perforated end plate includes multiple holes therein.

3. A low pressure igniter, as defined by claim 1, wherein the volume of said chamber is small whereby upon initiation of said initiator the small volume allows the pressure in the chamber to build up faster by reducing the time required to fill the volume of said chamber with gas.

4. A low pressure igniter, as defined by claim 1, wherein said sealing means comprises a film having a thickness of about one to two thousandths of an inch.

5. A low pressure igniter, as defined by claim 4, wherein said film of said sealing means comprises a plastic film.

6. A low pressure igniter, as defined by claim 4, wherein said film of said sealing means comprises a metallic film.

7. A low pressure igniter, as defined by claim 1, wherein said initiator is a side firing squib.

8. A low pressure igniter, as defined by claim 1, further including a sunken space formed in said base of said igniter adjacent said initiator and said chamber, an auto-ignition compound in said sunken space, and an auto-ignition closure separating said sunken space and auto-ignition compound from said ignition compound.

9. A low pressure igniter, as defined by claim 8, wherein said sunken space in said base has an annular shape and surrounds a portion of said initiator.

10. A low pressure igniter, as defined by claim 1,
wherein said skirt is roll crimped onto said perforated end plate to assemble said perforated end plate and said skirt together.

11. A low pressure igniter for a gas bag inflator having a gas generant material in the form of pellets or wafers that is characterized by providing, when functioning, a large diameter flame front producing hot gas and particles, and which is projectile free, comprising,
- an igniter housing including a base having a skirt extending from the periphery of said base, said base and said skirt of said housing being a single piece of material,
- a perforated end plate, said perforated end plate being attached to said skirt to form a chamber within said housing,
- an initiator having an initiating portion, said initiator being mounted in the base of said housing with the initiating portion thereof extending into said chamber,
- an ignition compound in said chamber, and
- sealing means having a predetermined low rupture pressure positioned within said chamber and sealing said perforated end plate to retain said ignition compound in said chamber until said igniter begins to function,
- whereby, upon initiation of said igniter, the flame front produced by said igniter does not eject the ignited flame at great force and velocity on a front of little width into the gas generant material of said inflator but instead is expelled into the gas generant material of said inflator under a force of significantly less power as a flame having a wide diameter that weaves itself into the space between the gas generant pellets or wafers and around them and smoothly ignites them without crushing them,
- wherein said perforated end plate includes multiple holes therein,
- wherein said skirt is roll crimped onto said perforated end plate to assemble said perforated end plate and said skirt together,
- wherein said sealing means comprises a film having a thickness of about one to two thousandths of an inch, and
- wherein said initiator is a side firing squib.

12. An inflator for a vehicle occupant restraint, comprising,
- an elongated cylindrical housing having an elongated central passage formed therethrough,
- a pyrotechnic gas generant material contained within the housing, said gas generant material being discontinuous, that is, having many openings therein and contained in said elongated central passage of said cylindrical housing,
- an igniter containing substantially all of an ignition compound for igniting the pyrotechnic gas generant material and having an initiator for igniting said ignition compound, said igniter being positioned adjacent the pyrotechnic gas generant material and defining a multiple hole exit opening adjacent said central passage formed in said cylindrical housing, said multiple hole exit opening being of substantially the same diameter as that of the central passage formed in said elongated cylindrical housing,
- said igniter having a housing including a base and a skirt extending from the periphery of said base and formed as a single piece of material therewith, a perforated end plate, said perforated end plate being attached to said skirt to form a chamber within said igniter housing,
- said initiator being mounted in the base of said igniter housing and having an initiating portion thereof extending into said chamber, said ignition compound being contained in said chamber, and
- sealing means having a predetermined low rupture pressure, sealing the perforated end plate to retain said ignition compound in said chamber until said igniter is initiated and begins to function,
- whereby, when initiated, ignition and burning of the igniter ignition compound expels through said perforated end plate a large diameter low pressure flame front with lots of hot particles that is projectile free onto the gas generant material in said inflator, which flame front smoothly weaves itself into and around the openings in said discontinuous gas generant material without effecting any crushing thereof, thereby smoothly igniting said gas generant material, and
- whereby, upon initiation of said igniter, the flame front produced by said igniter does not eject the ignited flame at great force and velocity on a front of little width into the gas generant material of said inflator but instead is expelled into the gas generant material of said inflator under a force of significantly less power as a flame having a wide diameter.

13. An inflator, as defined by claim 12,
wherein said generant material is comprised of a plurality of pellets.

14. An inflator, as defined by claim 12,
wherein said gas generant material is comprised of spaced wafers.

15. An inflator, as defined by claim 12,
wherein said elongated cylindrical housing is made of aluminum.

16. An inflator, as defined by claim 12,
wherein said elongated cylindrical housing is made of steel.

* * * * *